United States Patent
Deng

(10) Patent No.: US 10,784,004 B2
(45) Date of Patent: Sep. 22, 2020

(54) CONTAINMENT COOLING SYSTEM CAPABLE OF IMPROVING COOLANT UTILIZATION RATE

(71) Applicant: Sichuan Xingzhi Zhihui Intellectual Property Operation Co., Ltd., Chengdu, Sichuan (CN)

(72) Inventor: Liping Deng, Sichuan (CN)

(73) Assignee: Sichuan Xingzhi Zhihui Intellectual Property Operation Co., Ltd., Chengdu (CN)

( * ) Notice: Subject to any disclaimer, the term of this patent is extended or adjusted under 35 U.S.C. 154(b) by 399 days.

(21) Appl. No.: 15/843,098

(22) Filed: Dec. 15, 2017

(65) Prior Publication Data

US 2018/0358136 A1 Dec. 13, 2018

(30) Foreign Application Priority Data

Jun. 9, 2017 (CN) .......................... 2017 1 0437433

(51) Int. Cl.
| | | |
|---|---|---|
| *G21C 15/18* | (2006.01) | |
| *G21C 15/12* | (2006.01) | |
| *G21C 9/012* | (2006.01) | |
| *G21C 15/243* | (2006.01) | |

(52) U.S. Cl.
CPC ............. *G21C 15/18* (2013.01); *G21C 9/012* (2013.01); *G21C 15/12* (2013.01); *G21C 15/243* (2013.01); *Y02E 30/40* (2013.01)

(58) Field of Classification Search
CPC ................................ G21C 15/18; G21C 15/12
See application file for complete search history.

(56) References Cited

U.S. PATENT DOCUMENTS

| | | | | |
|---|---|---|---|---|
| 4,753,771 | A * | 6/1988 | Conway ................. | G21C 15/18 376/282 |
| 5,049,353 | A * | 9/1991 | Conway ................. | G21C 15/18 376/293 |
| 2009/0323884 | A1* | 12/2009 | Sato ....................... | G21C 13/00 376/283 |
| 2013/0272474 | A1* | 10/2013 | Conway ............... | G21C 13/022 376/299 |
| 2017/0162282 | A1* | 6/2017 | Lin ....................... | G21C 15/182 |

OTHER PUBLICATIONS

Bajorek, S. "AP1000 Passive Safety Systems" NRC Presentation, Aug. 2007, available at https://www.nrc.gov/docs/ML1523/ML15230A043.pdf. (Year: 2007).*

* cited by examiner

*Primary Examiner* — Sharon M Davis

(57) ABSTRACT

A containment cooling system capable of improving coolant utilization rate comprises a cooling water tank disposed above the containment, a spray header connected to the cooling water tank by a first communicating pipe, a bell-shaped shield, and a clearance, wherein the cooling water tank is disposed on top of the shield, and the spray header is located in the clearance; cooling fins are disposed in the clearance, wherein a flow passage is disposed between the cooling fins and the outer wall of the containment. The containment cooling system has a higher coolant utilization rate.

7 Claims, 2 Drawing Sheets

US 10,784,004 B2

CONTAINMENT COOLING SYSTEM CAPABLE OF IMPROVING COOLANT UTILIZATION RATE

RELATED APPLICATION(S)

This application claims priority to Chinese patent application No. 201710437433.7 filed on Jun. 9, 2017, the contents of which are hereby incorporated by reference in their entirety.

FIELD OF THE INVENTION

The present invention relates to the field of nuclear reactor equipment technology, and more particularly to a containment cooling system capable of improving coolant utilization rate.

BACKGROUND OF THE INVENTION

A nuclear reactor is a system that initiates, controls, and maintains a nuclear fission or fusion chain reaction. In a nuclear reactor, the rate of nuclear reaction can be precisely controlled, and its energy can be released at a slower rate for people to use. Nuclear reactors are used for many purposes, and the most important of which is to generate heat, to replace other fuels, and to generate steam to generate electricity or drive aircraft carriers and other facilities to operate. As an important energy source, nuclear reactors may not be overlooked in the course of operation. The containment spraying system is a protection system which is used to reduce the pressure and temperature in the containment when a leak of loop water occurs in the containment.

In the prior art, passive containment spray system is a protection system which can operate under the condition of power outage and provides important guarantee for the safety of a nuclear reactor. Further optimization of the structural design of passive containment spray system to further enhance coolant utilization rate under passive conditions is an important direction for those skilled in the art.

BRIEF SUMMARY OF THE INVENTION

For that further optimization of the structural design of passive containment spray system to further enhance coolant utilization rate under passive conditions is an important direction for those skilled in the art, the present invention provides a containment cooling system capable of improving coolant utilization rate which has a higher coolant utilization rate.

According to an embodiment of the present invention, a containment cooling system capable of improving coolant utilization rate, comprises a cooling water tank disposed above the containment, a spray header connected to the cooling water tank through a first communicating pipe, a bell-shaped shield used for covering the containment inside its interior, a spray header located in the clearance and a cooling fin disposed in the clearance. The spray header is located outside the containment and used for spraying cooling water to an outer wall of the containment. A clearance is disposed between an inner wall of the shield and the outer wall of the containment. The cooling water tank is disposed on top portion of the shield. A flow passage is disposed between the cooling fin and the outer wall of the containment, allowing medium to flow from one side to the other side of the cooling fin.

Specifically, the above cooling water tank is used for containing the cooling water as containment coolant. The cooling water tank is disposed above the containment. The cooling water can flow to the spray header through the first communicating pipe due to gravity, then sprayed by the spray header to achieve passive cooling of the containment. In the scheme, the spray header is disposed in the clearance, so that the cooling water is fully contacted with the outer wall of the containment as much as possible, so as to improve the cooling effect on the containment and facilitate the collection of the cooling water participating in the heat exchange for recycling.

Due to the atomization effect of the existing spray header on the cooling water, the heated water vapor will be mixed with a large amount of cooling water which is not sufficiently heat-absorbing. The cooling fins provided above can be used to block the heated water vapor and make it slower to move. In this way, the cooling water mixed therein can drop to the containment surface due to gravity for absorbing heat; at the same time, when water vapor contacts with the cooling fins, the water vapor can become liquid after exchanging heat with the cooling fins, and then drop to the containment surface due to gravity for absorbing heat. At the same time, when the water vapor contacts with the cooling fins, the liquid water droplets mixed therein can be collected on the surface of the cooling fins. After reaching a certain level, the water droplets can be reflowed or dropped to the containment surface for absorbing heat, thus, the containment cooling system can have a higher utilization rate of cooling water.

In the system, a flow passage is disposed between the cooling fins and the outer wall of the containment. Thus, liquid or gaseous cooling medium can pass the cooling fins through the flow passage. The above power can be derived from kinetic energy or gravitational potential energy of the cooling medium. In this way, the cooling blind angle can be avoided on the surface of the containment to ensure the cooling effect on the containment.

According to another embodiment of the present invention, a gas tank is disposed in the containment, the gas tank is connected with an upper part of the cooling water tank by a second communicating pipe, and the cooling water tank is a closed container. In this scheme, by providing the gas tank used for containing gas in the containment, when a leak of loop water occurs in the containment, the internal temperature of the containment rises, at this moment, gas in the gas tank expands. In this way, the internal pressure in the cooling water tank can be increased, and the above internal pressure increases to act on the cooling water, so that the flow rate of the cooling water ejected from the spray header can be increased, that is, the temperature in the containment is increased at a faster rate, and cooling water flow ejected from spray header is more, so as to achieve the purpose of strengthening the containment cooling effect, that is, the containment cooling system has a higher cooling reliability.

According to another embodiment of the present invention, as a strong support for the stability of the program, the cooling water tank is annular, and the axis of the cooling water tank is in line with the axis of the shield.

According to another embodiment of the present invention, in order to facilitate the timely discharge of cold fluid with too high temperature in the clearance and improve the cooling effect on the containment, a cooling water outlet is disposed at bottom of the shield.

According to another embodiment of the present invention, as the spray header includes a large number of communicating pipes and nozzles, and as a implementation scheme of all-directional cooling of the containment with structural stability, the spray header is symmetrically disposed above the containment.

As the containment is in operation, there will be a small fluctuation in the temperature, in order to avoid the cooling water in the cooling water tank being squeezed out because of the internal pressure change in the gas tank under normal circumstances, a rupture disk is disposed in the gas tank and/or the second communicating pipe, the rupture disk is ruptured in the process of internal pressure increasing of the gas tank, and the rupture disk in intact state realizes isolation of space on two sides thereof. In this way, the rupture disk ruptures when the internal pressure of the side of the rupture disc adjacent to the gas tank increases to a certain extent. At this time, the cooling water in the cooling water tank exerts a cooling effect on the containment.

An exhaust hole is disposed on top of the shield, and a steam separator is disposed in the exhaust hole and/or in the clearance. The above steam separator can make the cooling water with insufficient absorption condensed into large drops again and drop to the clearance in order to re-cool the containment and improve the utilization rate of cooling water.

As a implementation scheme that the cooling fins can cool the water vapor at any time, the cooling fins comprise a pipe and a support frame for the connection between the pipe and the containment. The above pipe is used to pass in cold fluid, in this case, water vapor can be regarded as hot fluid, and the pipe can be regarded as a wall-mounted heat exchanger. The cooling fins are installed on the surface of the containment by the support frame, so as to provide an easy way to process and manufacture. As an easy way to manufacture, with strong cooling capacity for water vapor, the above pipe can adopt rectangular tube, circular tube, etc., and the overall pipe is spiral.

In sum:

specifically, the above cooling water tank is used for containing the cooling water as containment coolant. The cooling water tank is disposed above the containment. The cooling water can flow to the spray header through the first communicating pipe due to gravity, then sprayed by the spray header to achieve passive cooling of the containment. In the scheme, the spray header is disposed in the clearance, so that the cooling water is fully contacted with the outer wall of the containment as much as possible, so as to improve the cooling effect on the containment and facilitate the collection of the cooling water participating in the heat exchange for recycling.

Due to the atomization effect of the existing spray header on the cooling water, the heated water vapor will be mixed with a large amount of cooling water which is not sufficiently heat-absorbing. The cooling fins provided above can be used to block the heated water vapor and make it slower to move. In this way, the cooling water mixed therein can drop to the containment surface due to gravity for absorbing heat; at the same time, when water vapor contacts with the cooling fins, the water vapor can become liquid after exchanging heat with the cooling fins, and then drop to the containment surface due to gravity for absorbing heat. At the same time, when the water vapor contacts with the cooling fins, the liquid water droplets mixed therein can be collected on the surface of the cooling fins. After reaching a certain level, the water droplets can be reflowed or dropped to the containment surface for absorbing heat, thus, the containment cooling system can have a higher utilization rate of cooling water.

In the system, a flow passage is disposed between the cooling fins and the outer wall of the containment. Thus, liquid or gaseous cooling medium can pass the cooling fins through the flow passage. The above power can be derived from kinetic energy or gravitational potential energy of the cooling medium. In this way, the cooling blind angle can be avoided on the surface of the containment to ensure the cooling effect on the containment.

DETAILED DESCRIPTION OF THE PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Embodiment 1

Figure 1:
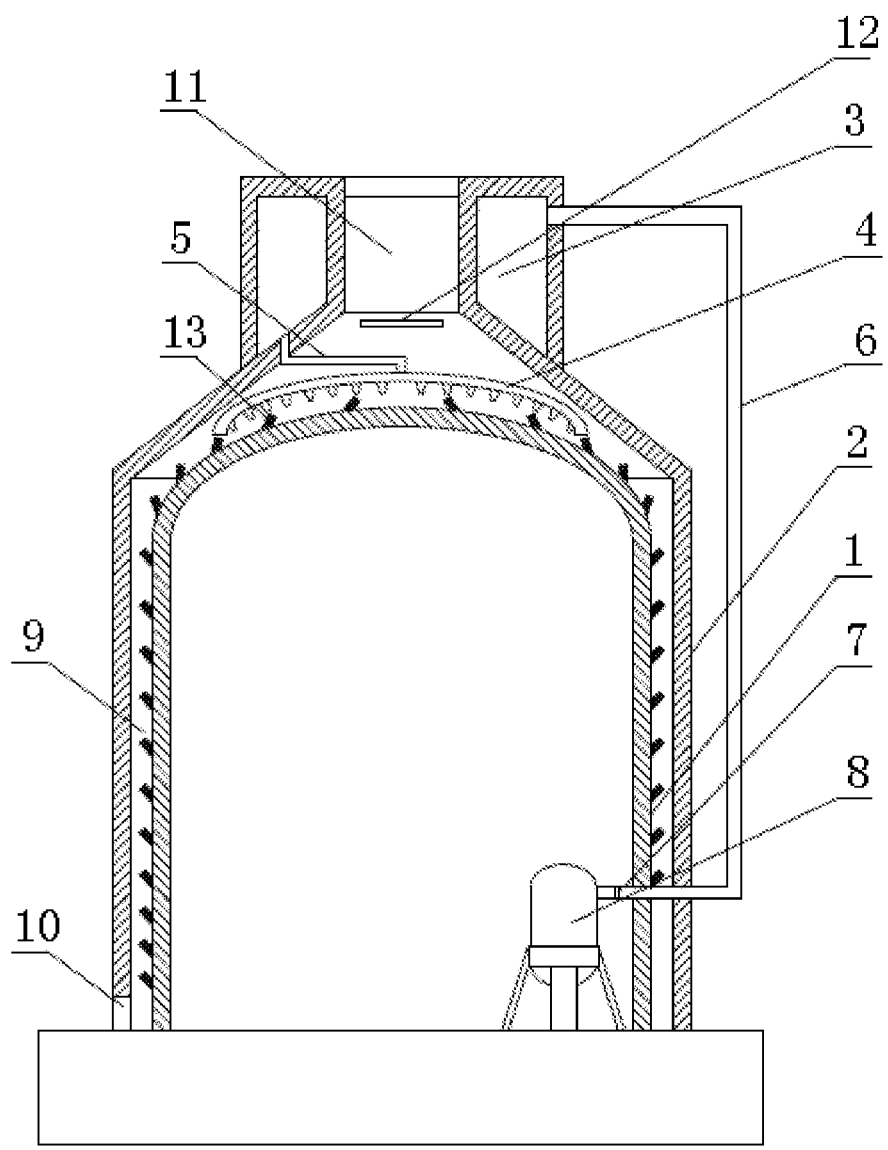
FIG. 1 is a section view of an embodiment of the containment cooling system capable of improving coolant utilization rate according to the present invention.
Figure 2:
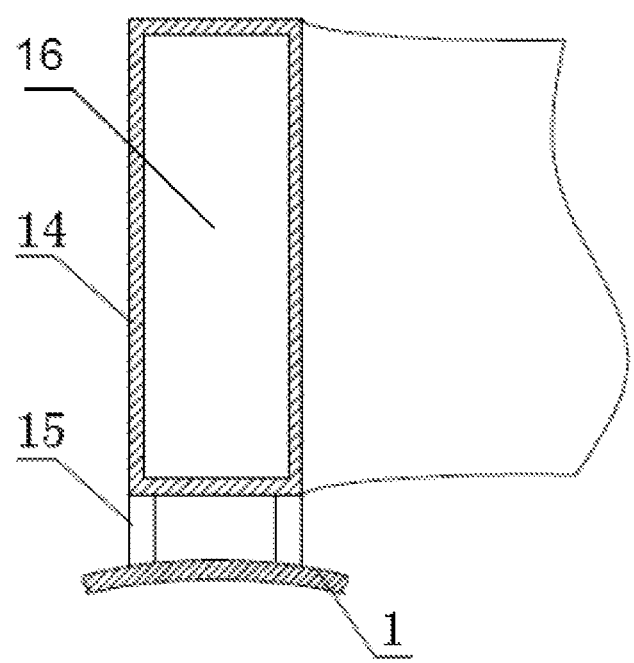
FIG. 2 is a schematic diagram showing the connection between cooling fins and the containment of an embodiment of the containment cooling system capable of improving coolant utilization rate according to the present invention.

As shown in FIG. 1 and FIG. 2, the containment cooling system capable of improving coolant utilization rate comprises a cooling water tank 3 disposed above the containment 1, a spray header 4 connected to the cooling water tank 3 through a first communicating pipe 5, a bell-shaped shield 2 used for covering the containment 1 inside its interior, a spray header 4 located in the clearance 9 and a cooling fin 13 disposed in the clearance 9. The spray header 4 is located outside the containment 1 and used for spraying cooling water to an outer wall of the containment 1. A clearance 9 is disposed between an inner wall of the shield 2 and the outer wall of the containment 1. The cooling water tank 3 is disposed on top portion of the shield 2. A flow passage is disposed between the cooling fin 13 and the outer wall of the containment 1, allowing medium to flow from one side to the other side of the cooling fin 13.

Specifically, the above cooling water tank 3 is used for containing the cooling water as containment 1 coolant. The cooling water tank 3 is disposed above the containment 1. The cooling water can flow to the spray header 4 through the first communicating pipe 5 due to gravity, then sprayed by the spray header 4 to achieve passive cooling of the containment 1. In the scheme, the spray header 4 is disposed in the clearance 9, so that the cooling water is fully contacted with the outer wall of the containment 1 as much as possible, so as to improve the cooling effect on the containment 1 and facilitate the collection of the cooling water participating in the heat exchange for recycling.

Due to the atomization effect of the existing spray header 4 on the cooling water, the heated water vapor will be mixed with a large amount of cooling water which is not sufficiently heat-absorbing. The cooling fins 13 provided above can be used to block the heated water vapor and make it slower to move. In this way, the cooling water mixed therein can drop to the containment 1 surface due to gravity for absorbing heat; at the same time, when water vapor contacts with the cooling fins 13, the water vapor can become liquid after exchanging heat with the cooling fins 13, and then drop to the containment 1 surface due to gravity for absorbing heat. At the same time, when the water vapor contacts with the cooling fins 13, the liquid water droplets mixed therein can be collected on the surface of the cooling fins 13. After reaching a certain level, the water droplets can be reflowed or dropped to the containment 1 surface for absorbing heat, thus, the containment cooling system can have a higher utilization rate of cooling water.

In the system, a flow passage is disposed between the cooling fins 13 and the outer wall of the containment 1. Thus, liquid or gaseous cooling medium can pass the cooling fins 13 through the flow passage. The above power can be derived from kinetic energy or gravitational potential energy of the cooling medium. In this way, the cooling blind angle can be avoided on the surface of the containment 1 to ensure the cooling effect on the containment.

Embodiment 2

As shown in FIG. 1 and FIG. 2, another embodiment is based on embodiment 1. A gas tank 8 is disposed in the containment 1, the gas tank 8 is connected with an upper part of the cooling water tank 3 by a second communicating pipe 6, and the cooling water tank 3 is a closed container. In this scheme, by providing the gas tank 8 used for containing gas in the containment 1, when a leak of loop water occurs in the containment 1, the internal temperature of the containment 1 rises, at this moment, gas in the gas tank 8 expands. In this way, the internal pressure in the cooling water tank 3 can be increased, and the above internal pressure increases to act on the cooling water, so that the flow rate of the cooling water ejected from the spray header 4 can be increased, that is, the temperature in the containment 1 is increased at a faster rate, and cooling water flow ejected from spray header 4 is more, so as to achieve the purpose of strengthening the containment 1 cooling effect, that is, the containment cooling system has a higher cooling reliability.

As a strong support for the stability of the program, the cooling water tank 3 is annular, and the axis of the cooling water tank 3 is in line with the axis of the shield 2.

In order to facilitate the timely discharge of cold fluid with too high temperature in the clearance 9 and improve the cooling effect on the containment 1, a cooling water outlet 10 is disposed at bottom of the shield 2.

As the spray header 4 includes a large number of communicating pipes and nozzles, and as a implementation scheme of all-directional cooling of the containment 1 with structural stability, the spray header 4 is symmetrically disposed above the containment 1.

As the containment 1 is in operation, there will be a small fluctuation in the temperature, in order to avoid the cooling water in the cooling water tank 3 being squeezed out because of the internal pressure change in the gas tank 8 under normal circumstances, a rupture disk 7 is disposed in the gas tank 8 and/or the second communicating pipe 6, the rupture disk 7 is ruptured in the process of internal pressure increasing of the gas tank 8, and the rupture disk 7 in intact state realizes isolation of space on two sides thereof. In this way, the rupture disk 7 ruptures when the internal pressure of the side of the rupture disc 7 adjacent to the gas tank 8 increases to a certain extent. At this time, the cooling water in the cooling water tank 3 exerts a cooling effect on the containment 1.

An exhaust hole 11 is disposed on top of the shield 2, and a steam separator 12 is disposed in the exhaust hole 11 and/or in the clearance 9. The above steam separator 12 can make the cooling water with insufficient absorption condensed into large drops again and drop to the clearance 9 in order to re-cool the containment 1 and improve the utilization rate of cooling water.

Embodiment 3

As shown in FIG. 1 and FIG. 2, another embodiment is based on any of the embodiments above.

As an implementation scheme that the cooling fins 13 can cool the water vapor at any time, the cooling fins 13 comprise a pipe 14 and a support frame 15 for the connection between the pipe 14 and the containment 1. The above pipe 14 is used to pass in cold fluid and has a flow passage 16 allowing the cooling water to flow from one side to the other side of the cooling fin 13, in this case, water vapor can be regarded as hot fluid, and the pipe 14 can be regarded as a wall-mounted heat exchanger. The cooling fins 13 are installed on the surface of the containment 1 by the support frame 15, so as to provide an easy way to process and manufacture. As an easy way to manufacture, with strong cooling capacity for water vapor, the above pipe 14 can adopt rectangular tube, circular tube, etc., and pipe 14 is spiral, starting at the bottom end of the containment 1 and ending at the top end of the containment 1, with the entrances and exits of the pipe 14 located above and below.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A containment cooling system capable of improving coolant utilization rate, for cooling a containment, the system comprising:
   a cooling water tank disposed above the containment;
   a spray header connected to the cooling water tank through a first communicating pipe, wherein the spray header is located outside the containment and used for spraying cooling water to an outer wall of the containment;
   a bell-shaped shield used for covering the containment inside an interior of the shield, wherein a clearance is disposed between an inner wall of the shield and the outer wall of the containment, the cooling water tank is disposed on a top portion of the shield, and the spray header is located in the clearance; and
   a cooling fin disposed in the clearance;
   wherein the cooling fin comprises a pipe and a support frame connected between the pipe and the outer wall of the containment, the pipe having a flow passage allowing the cooling water to flow from one side to the other side of the cooling fin.

2. The containment cooling system according to claim 1, further comprising a gas tank disposed in the containment, wherein the gas tank is connected with an upper part of the cooling water tank though a second communicating pipe, and the cooling water tank is a closed container.

3. The containment cooling system according to claim 2, further comprising a rupture disk disposed in the gas tank and/or the second communicating pipe, wherein the rupture disk is ruptured during an increase of pressure in the gas tank, and the rupture disk in an intact state is capable of isolating a space on both sides thereof.

4. The containment cooling system according to claim 1, wherein the cooling water tank is annular, and the axis of the cooling water tank is in line with the axis of the shield.

5. The containment cooling system according to claim 1, wherein a cooling water outlet disposed at a bottom portion of the shield.

6. The containment cooling system according to claim 1, wherein the spray header is symmetrically disposed above the containment.

7. The containment cooling system according to claim 1, wherein an exhaust hole is disposed on a top portion of the shield, and a steam separator is disposed in the exhaust hole and/or in the clearance.

\* \* \* \* \*